United States Patent
Ueno et al.

(10) Patent No.: US 10,174,971 B2
(45) Date of Patent: Jan. 8, 2019

(54) HEAT CYCLE SYSTEM

(71) Applicant: ASAHI GLASS COMPANY, LIMITED, Chiyoda-ku (JP)

(72) Inventors: Katsuya Ueno, Chiyoda-ku (JP); Hiroki Hayamizu, Chiyoda-ku (JP); Hidekazu Okamoto, Chiyoda-ku (JP); Masamichi Ippommatsu, Nishinomiya (JP)

(73) Assignee: AGC Inc., Chiyoda-ku (JP)

( * ) Notice: Subject to any disclaimer, the term of this patent is extended or adjusted under 35 U.S.C. 154(b) by 1 day.

(21) Appl. No.: 15/419,074

(22) Filed: Jan. 30, 2017

(65) Prior Publication Data
US 2017/0138642 A1 May 18, 2017

Related U.S. Application Data (63) Continuation of application No. PCT/JP2015/072705, filed on Aug. 10, 2015.

(30) Foreign Application Priority Data

Aug. 12, 2014 (JP) .................. 2014-164315

(51) Int. Cl.
*F25B 1/04* (2006.01)
*F04B 39/00* (2006.01)
(Continued)

(52) U.S. Cl.
CPC .............. *F25B 1/04* (2013.01); *C09K 5/045* (2013.01); *F04B 39/00* (2013.01);
(Continued)

(58) Field of Classification Search
CPC .. F25B 1/04; F04B 39/00; F04B 27/12; F04B 35/04; F24F 1/08
See application file for complete search history.

(56) References Cited

U.S. PATENT DOCUMENTS

2005/0101695 A1* 5/2005 Wada ............... H02K 3/345
523/174
2011/0011124 A1* 1/2011 Matsuura ........... C09K 5/045
62/468
(Continued)

FOREIGN PATENT DOCUMENTS

EP    2 267 311 A1   12/2010
EP    2 711 405 A1    3/2014
(Continued)

OTHER PUBLICATIONS

International Search Report dated Oct. 27, 2015 in PCT/JP2015/072705, filed on Aug. 10, 2015.
Ya. A. Lisochkin et al., "Explosive-Hazard Estimates for Several Fluorine-Containing Monomers and Their Mixtures, Based on the Minimum Ignition Pressure with a Fixed Igniter Energy", Combustion, Explosion, and Shock Waves, vol. 42, No. 2, 2006, pp. 4.

*Primary Examiner* — Elizabeth J Martin
(74) *Attorney, Agent, or Firm* — Oblon, McClelland, Maier & Neustadt, L.L.P.

(57) ABSTRACT

To provide a heat cycle system with high durability, which employs a working fluid for heat cycle containing trifluoroethylene having a low global warming potential.

A heat cycle system 10 which has a circulation path in which a working fluid for heat cycle containing trifluoroethylene is circulated from a compressor 11 via a condenser 12, an expansion valve 13 and an evaporator 14 to the compressor 11, wherein a conductor wire provided in the circulation path is covered with a heat resistant material having a heat resistance of at least 300° C.

13 Claims, 2 Drawing Sheets

(51) Int. Cl.
*F24F 1/08* (2011.01)
*C09K 5/04* (2006.01)
*F04C 18/02* (2006.01)
*F04C 29/00* (2006.01)
*F04B 27/12* (2006.01)
*F04B 35/04* (2006.01)
*F04C 18/34* (2006.01)
*F04D 17/10* (2006.01)
*F04D 25/06* (2006.01)

(52) U.S. Cl.
CPC ...... *F04C 18/0215* (2013.01); *F04C 29/0085* (2013.01); *F24F 1/08* (2013.01); *C09K 2205/122* (2013.01); *C09K 2205/126* (2013.01); *C09K 2205/22* (2013.01); *F04B 27/12* (2013.01); *F04B 35/04* (2013.01); *F04C 18/34* (2013.01); *F04C 2240/40* (2013.01); *F04D 17/10* (2013.01); *F04D 25/06* (2013.01)

(56) References Cited

U.S. PATENT DOCUMENTS

| 2014/0070132 | A1 | 3/2014 | Fukushima |
| 2014/0077122 | A1* | 3/2014 | Fukushima ............ C09K 5/044 252/67 |
| 2015/0233622 | A1 | 8/2015 | Yajima et al. |

FOREIGN PATENT DOCUMENTS

| JP | 2000-87855 | 3/2000 |
| JP | 2004-343881 | 12/2004 |
| JP | 2005-351183 | 12/2005 |
| JP | 2010-232082 | 10/2010 |
| JP | 2013-178075 | 9/2013 |
| JP | 2014-98166 | 5/2014 |
| WO | WO 2012/157764 A1 | 11/2012 |

* cited by examiner

HEAT CYCLE SYSTEM

TECHNICAL FIELD

The present invention relates to a heat cycle system employing a working fluid containing trifluoroethylene. Particularly, it relates to a heat cycle system in which self-decomposition reaction of trifluoroethylene is suppressed even if the interior of the system is at high temperature or under high pressure.

BACKGROUND ART

Heretofore, as a working fluid for heat cycle such as a refrigerant for a refrigerator, a refrigerant for an air-conditioning apparatus, a working fluid for power generation system (such as exhaust heat recovery power generation), a working fluid for a latent heat transport apparatus (such as a heat pipe) or a secondary cooling fluid, a chlorofluorocarbon (CFC) such as chlorotrifluoromethane or dichlorodifluoromethane or a hydrochlorofluorocarbon (HCFC) such as chlorodifluoromethane has been used. However, influences of CFCs and HCFCs over the ozone layer in the stratosphere have been pointed out, and their use is regulated at present.

Under the above conditions, as a working fluid for heat cycle, a hydrofluorocarbon (HFC) which has less influence over the ozone layer, such as difluoromethane (HFC-32), tetrafluoroethane or pentafluoroethane (HFC-125) has been used, instead of CFCs and HCFCs. For example, R410A (a pseudoazeotropic mixture refrigerant of HFC-32 and HFC-125 in a mass ratio of 1:1) is a refrigerant which has been widely used. However, it is pointed out that HFCs may cause global warming.

R410A has been widely used for a common air-conditioning apparatus such as a so-called package air-conditioner or room air-conditioner, due to its high refrigerating capacity. However, it has a global warming potential (GWP) of so high as 2,088, and accordingly development of a working fluid with low GWP has been desired.

Accordingly, in recent years, a hydrofluoroolefin (HFO) i.e. a HFC having a carbon-carbon double bond is expected, which is a working fluid having less influence over the ozone layer and having less influence over global warming, since the carbon-carbon double bond is likely to be decomposed by OH radicals in the air. In this specification, a saturated hydrofluorocarbon will be referred to as a HFC and distinguished from a HFO unless otherwise specified. Further, a HFC may be referred to as a saturated hydrofluorocarbon in some cases. In this specification, abbreviated names of halogenated hydrocarbon compounds such as HFCs and HFOs are described in brackets after the compound names, and in this specification, the abbreviated names are employed instead of the compound names as the case requires.

As a working fluid employing a HFO, for example, Patent Document 1 discloses a technique relating to a working fluid using trifluoroethylene (HFO-1123) which has the above properties and with which excellent cycle performance will be obtained. Patent Document 1 also discloses an attempt to obtain a working fluid comprising HFO-1123 and various HFCs in combination for the purpose of increasing the flame retardancy, cycle performance, etc. of the working fluid.

Further, HFO-1123 is known to undergo self-decomposition with an ignition source at high temperature or under high pressure, when used alone. Therefore, Non-Patent Document 1 discloses an attempt to suppress self-decomposition reaction by mixing HFO-1123 with another component such as vinylidene fluoride to form a mixture having a lowered content of HFO-1123.

PRIOR ART DOCUMENTS

Patent Document

Patent Document 1: WO2012/157764

Non-Patent Document

Non-Patent Document 1: Combustion, Explosion, and Shock Waves, Vol. 42, No 2, pp. 140-143, 2006

DISCLOSURE OF INVENTION

Technical Problem

In a case where use of HFO-1123 as a working fluid is studied, it should be noted that in the heat cycle system, if HFO-1123 is exposed to high temperature or high pressure e.g. by abnormal operation, HFO-1123 may undergo self-decomposition reaction.

Under these circumstances, it is an object of the present invention to provide a heat cycle system which employs as a working fluid trifluoroethylene having less influence over global warming and having favorable cycle performance (capacity), in which self-decomposition reaction of HFO-1123 is avoided even in a case where trouble such as abnormal operation occurs.

Solution to Problem

The present inventors have conducted extensive studies to achieve the above object and as a result, found a constitution to avoid self-decomposition reaction of HFO-1123 even if the heat cycle system is in a predetermined abnormal operation state, and accomplished the present invention.

That is, the present invention provides the heat cycle system of the following [1] to [14].

[1] A heat cycle system, which has a circulation path in which a working fluid for heat cycle containing trifluoroethylene is circulated from a compressor via a condenser, an expansion valve and an evaporator to the compressor,
wherein a conductor wire provided in the circulation path is covered with a heat resistant material having a heat resistance of at least 300° C.

[2] The heat cycle system according to [1], wherein the heat resistant material is a heat resistant material containing at least one material selected from the group consisting of mica, asbestos, alumina, silica glass, a polyimide resin, a polyetherimide resin and a polyamide imide resin.

[3] The heat cycle system according to [1] or [2], wherein the heat resistant material is a heat resistant material containing at least one material selected from the group consisting of mica, asbestos, alumina and silica glass.

[4] The heat cycle system according to [2] or [3], wherein the heat resistant material is a heat resistant material comprising a material selected from the group consisting of mica, asbestos, alumina and silica glass, and a material selected from the group consisting of a polyimide resin, a polyetherimide resin and a polyamide imide resin, in combination.

[5] The heat cycle system according to any one of [1] to [4], wherein the outer periphery of the conductor wire covered with the heat resistant material is further protected with a silicone resin.

[6] The heat cycle system according to any one of [1] to [5], wherein the conductor wire connects a driving means of the compressor and a power supply terminal capable of supplying an electric power from an external power source, provided on the outer shell of the compressor.

[7] The heat cycle system according to any one of [1] to [6], wherein the working fluid for heat cycle contains trifluoroethylene in an amount of larger than 50 mass %.

[8] The heat cycle system according to [7], wherein the working fluid for heat cycle contains trifluoroethylene in an amount of larger than 60 mass %.

[9] The heat cycle system according to any one of [1] to [8], wherein the working fluid for heat cycle further contains at least one member selected from the group consisting of difluoromethane, 1,1,1,2-tetrafluoroethane and pentafluoroethane.

[10] The heat cycle system according to any one of [1] to [9], wherein the working fluid for heat cycle further contains at least one member selected from the group consisting of 2,3,3,3-tetrafluoro-1-propene, trans-1,2-difluoroethylene and cis-1,2-difluoroethylene.

[11] The heat cycle system according to any one of [1] to [10], wherein the working fluid for heat cycle is a mixed fluid of trifluoroethylene and difluoromethane.

[12] The heat cycle system according to any one of [1] to [11], wherein the working fluid for heat cycle is a mixed fluid of trifluoroethylene, difluoromethane and 2,3,3,3-tetrafluoro-1-propene.

[13] The heat cycle system according to any one of [1] to [12], which is a refrigerating apparatus, an air-conditioning apparatus, a power generation system, a heat transport apparatus or a secondary cooling machine.

[14] The heat cycle system according to any one of [1] to [13], which is a room air-conditioner, a store package air-conditioner, a building package air-conditioner, a plant package air-conditioner, a gas engine heat pump, a train air-conditioning system, an automobile air-conditioning system, a built-in showcase, a separate showcase, an industrial fridge freezer, an ice making machine or a vending machine.

Advantageous Effects of Invention

According to the present invention, it is possible to provide a heat cycle system which employs a working fluid having suppressed influence over global warming and having practical heat cycle performance containing HFO-1123, and in which self-decomposition reaction of HFO-1123 can be avoided even in a case where the interior of the system is in an abnormal high temperature or high pressure condition.

DESCRIPTION OF EMBODIMENTS

Now, embodiments of the present invention will be described with reference to drawings.

First Embodiment

Now, a working fluid for heat cycle used for the heat cycle system of the present invention (hereinafter sometimes referred to simply as a working fluid) will be described. The working fluid used is a working fluid for heat cycle containing HFO-1123. Further, the working fluid used is preferably a working fluid for heat cycle having a content of HFO-1123 in the entire amount of the working fluid being higher than 50 mass % and at most 100 mass %.

The working fluid for heat cycle used in the present invention is a working fluid composed solely of HFO-1123 or a mixed fluid containing HFO-1123 and another working fluid, as mentioned above. Here, the global warming potential (100 years) of HFO-1123 is 0.3 as a value measured in accordance with Intergovernmental Panel on Climate Change (IPCC), Fourth assessment report. In this specification, unless otherwise specified, GWP is a value (100 years) in IPCC, Fourth assessment report.

In such a manner, the working fluid of the present invention, which contains HFO-1123 having a very low GWP in an amount of larger than 50 mass %, has a low GWP. In a case where GWP of the component other than HFO-1123 is higher than that of HFO-1123, for example, as in the case of the after-described saturated HFC, the lower its content is, the lower GWP of the composition is.

HFO-1123 used for the working fluid for heat cycle may undergo chain self-decomposition reaction with an ignition source at high temperature or under high pressure, when its content is high in the working fluid. Although the self-decomposition reaction can be suppressed by lowering the content of HFO-1123 in the working fluid, if the content is too low, GWP tends to increase, and the refrigerating capacity and the coefficient of performance tend to decrease in many cases, although it depends on another working fluid to be used in combination.

Here, the working fluid for heat cycle has a content of HFO-1123 in the working fluid of preferably higher than 50 mass %, more preferably higher than 60 mass %, further preferably higher than 70 mass %, in application to the heat cycle system of the present invention. By such a content, GWP will be sufficiently low, and a favorable refrigerating capacity can be secured.

[Optional Component]

The working fluid for heat cycle to be used in the present invention may optionally contain a compound commonly used for a working fluid in addition to HFO-1123 within a range not to impair effects of the present invention.

The optional component is preferably a HFC or a HFO other than HFO-1123.

(HFC)

As the HFC, for example, a HFC having an effect to decrease the temperature glide, an effect to improve the capacity or an effect to further increase the efficiency, when used in combination with HFO-1123, is used. When the working fluid for heat cycle used in the present invention contains such a HFC, more favorable cycle performance will be obtained.

A HFC is known to have a high GWP as compared with HFO-1123. Accordingly, a HFC used as the optional component is selected with a view to adjusting the GWP within an acceptable range, in addition to improving cycle performance as the working fluid.

A HFC which has less influence over the ozone layer and which has less influence over global warming, is specifically preferably a $C_{1-5}$ HFC. The HFC may be linear, branched or cyclic.

The HFC may, for example, be difluoromethane (HFC-32), difluoroethane, trifluoroethane, tetrafluoroethane, pentafluoroethane (HFC-125), pentafluoropropane, hexafluoropropane, heptafluoropropane, pentafluorobutane or heptafluorocyclopentane.

Particularly, in view of less influence over the ozone layer and excellent refrigerating cycle performance, the HFC is preferably HFC-32, 1,1-difluoroethane (HFC-152a), 1,1,1-trifluoroethane (HFC-143a), 1,1,2,2-tetrafluoroethane (HFC-134), 1,1,1,2-tetrafluoroethane (HFC-134a) or HFC-125, more preferably HFC-32, HFC-134a or HFC-125.

The HFC may be used alone or in combination of two or more.

Here, with respect to GWPs of the above preferred HFCs, GWP of HFC-32 is 675, GWP of HFC-134a is 1,430, and GWP of HFC-125 is 3,500. With a view to keeping GWP of the obtainable working fluid low, the HFC is most preferably HFC-32.

(HFO Other Than HFO-1123)

The HFO other than HFO-1123 may, for example, be 2,3,3,3-tetrafluoro-1-propene HFO-1234yf), trans-1,2-difluoroethylene (HFO-1132(E)), cis-1,2-difluoroethylene (HFO-1132(Z)), 2-fluoropropene (HFO-1261yf), 1,1,2-trifluoropropene (HFO-1243yc), trans-1,2,3,3,3-pentafluoropropene (HFO-1225ye(E)), cis-1,2,3,3,3-pentafluoropropene (HFO-1225ye(Z)), trans-1,3,3,3-tetrafluoropropene (HFO-1234ze(E)), cis-1,3,3,3-tetrafluoropropene (HFO-1234ze(Z)) or 3,3,3-trifluoropropene (HFO-1243zf).

Particularly, in view of a high critical temperature, excellent safety and excellent coefficient of performance, preferred is HFO-1234yf, HFO-1234ze(E) or HFO-1234ze(Z).

The HFO other than HFO-1123 may be used alone or in combination of two or more.

In a case where the working fluid for heat cycle used in the present invention contains the HFC and/or the HFO other than HFO-1123, the total content of the HFC and the HFO other than HFO-1123 in 100 mass % of the working fluid is preferably at most 50 mass %, more preferably from 0 to 40 mass %, most preferably from 0 to 30 mass %. The total content of the HFC and the HFO other than HFO-1123 in the working fluid is properly adjusted within the above range depending upon the type of the HFC and the HFO other than HFO-1123 used. On that occasion, the total content is adjusted with a view to decreasing the temperature glide, improving the capacity or further improving the efficiency, when used in combination with HFO-1123 for heat cycle, and further considering the global warming potential.

(Optional Component Other Than HFC and HFO)

The working fluid for heat cycle used in the present invention may contain, other than the above HFC and HFO, carbon dioxide, a hydrocarbon, a chlorofluoroolefin (CFO), a hydrochlorofluoroolefin (HCFO) or the like. Such an optional component other than the HFC and the HFO is preferably a component which has less influence over the ozone layer and which has less influence over global warming.

The hydrocarbon may, for example, be propane, propylene, cyclopropane, butane, isobutane, pentane or isopentane.

The hydrocarbon may be used alone or in combination of two or more.

In a case where the working fluid for heat cycle used in the present invention contains a hydrocarbon, its content is preferably at most 10 mass %, more preferably from 1 to 10 mass %, further preferably from 1 to 7 mass %, most preferably from 2 to 5 mass % per 100 mass % of the working fluid. When the content of the hydrocarbon is at least the lower limit, the solubility of a mineral refrigerant oil in the working fluid will be more favorable.

The CFO may, for example, be chlorofluoropropene or chlorofluoroethylene. With a view to suppressing flammability of the working fluid without significantly decreasing the cycle performance of the working fluid for heat cycle of the present invention, the CFO is preferably 1,1-dichloro-2,3,3,3-tetrafluoropropene (CFO-1214ya), 1,3-dichloro-1,2,3,3-tetrafluoropropene (CFO-1214yb) or 1,2-dichloro-1,2-difluoroethylene (CFO-1112).

The CFO may be used alone or in combination of two or more.

In a case where the working fluid for heat cycle used in the present invention contains the CFO, its content is preferably 50 mass %, more preferably from 0 to 40 mass %, most preferably from 0 to 30 mass % per 100 mass % of the working fluid. When the content of the CFO exceeds the lower limit, the flammability of the working fluid tends to be suppressed. When the content of the CFO is at most the upper limit, favorable cycle performance is likely to be obtained.

The HCFO may, for example, be hydrochlorofluoropropene or hydrochlorofluoroethylene. With a view to suppressing the flammability of the working fluid without significantly decreasing the cycle performance of the working fluid for heat cycle used in the present invention, the HCFO is preferably 1-chloro-2,3,3,3-tetrafluoropropene (HCFO-1224yd) or 1-chloro-1,2-difluoroethylene (HCFO-1122).

The HCFO may be used alone or in combination of two or more.

In a case where the working fluid for heat cycle of the present invention contains the HCFO, the content of the HCFO per 100 mass % of the working fluid is preferably at most 50 mass %, more preferably from 0 to 40 mass %, most preferably from 0 to 30 mass %. When the content of the HCFO exceeds the lower limit, the flammability of the working fluid tends to be suppressed. When the content of the HCFO is at most the upper limit, favorable cycle performance is likely to be obtained.

In a case where the working fluid for heat cycle used in the present invention contains the above optional component, the total content of such optional components is preferably at most 50 mass % per 100 mass % of the working fluid.

The above-described working fluid for heat cycle used in the present invention contains HFO-1123 which is a HFO having less influence over global warming and which is excellent in the capacity as a working fluid, and has practical cycle performance while its influence over global warming is suppressed.

(Composition for Heat Cycle System)

The above working fluid for heat cycle is usually mixed with a refrigerant oil to form a composition for a heat cycle system used in the heat cycle system of the present invention. Such a composition for a heat cycle system is used as enclosed in the circulation path of the heat cycle system. The composition for a heat cycle system may further contain a known additive such as a stabilizer or a leak detecting substance.

(Refrigerant Oil)

As a refrigerant oil, a known refrigerant oil which has been used for the composition for a heat cycle system together with a working fluid comprising a halogenated hydrocarbon may be used without any particular restrictions. The refrigerant oil may, for example, be specifically an oxygen-containing refrigerant oil (such as an ester refrigerant oil or an ether refrigerant oil), a fluorinated refrigerant oil, a mineral refrigerant oil or a hydrocarbon refrigerant oil.

The ester refrigerant oil may, for example, be a dibasic acid ester oil, a polyol ester oil, a complex ester oil or a polyol carbonate oil.

The dibasic acid ester oil is preferably an ester of a $C_{5-10}$ dibasic acid (such as glutaric acid, adipic acid, pimelic acid, suberic acid, azelaic acid or sebacic acid) with a $C_{1-15}$ monohydric alcohol which is linear or has a branched alkyl group (such as methanol, ethanol, propanol, butanol, pentanol, hexanol, heptanol, octanol, nonanol, decanol, undecanol, dodecanol, tridecanol, tetradecanol or pentadecanol). The dibasic acid ester oil may, for example, be specifically ditridecyl glutarate, di(2-ethylhexyl) adipate, diisodecyl adipate, ditridecyl adipate or di(3-ethylhexyl) sebacate.

The polyol ester oil is preferably an ester of a diol (such as ethylene glycol, 1,3-propanediol, propylene glycol, 1,4-butanediol, 1,2-butanediol, 1,5-pentadiol, neopentyl glycol, 1,7-heptanediol or 1,12-dodecanediol) or a polyol having from 3 to 20 hydroxy groups (such as trimethylolethane, trimethylolpropane, trimethylolbutane, pentaerythritol, glycerol, sorbitol, sorbitan or sorbitol/glycerin condensate) with a $C_{6-20}$ fatty acid (such as a linear or branched fatty acid such as hexanoic acid, heptanoic acid, octanoic acid, nonanoic acid, decanoic acid, undecanoic acid, dodecanoic acid, eicosanoic acid or oleic acid, or a so-called neo acid having a quaternary a carbon atom).

The polyol ester oil may have a free hydroxy group.

The polyol ester oil is preferably an ester (such as trimethylolpropane tripelargonate, pentaerythritol 2-ethylhexanoate or pentaerythritol tetrapelargonate) of a hindered alcohol (such as neopentyl glycol, trimethylolethane, trimethylolpropane, trimethylolbutane or pentaerythritol).

The complex ester oil is an ester of a fatty acid and a dibasic acid, with a monohydric alcohol and a polyol. The fatty acid, the dibasic acid, the monohydric alcohol and the polyol may be as defined above.

The polyol carbonate oil is an ester of carbonic acid with a polyol.

The polyol may be the above-described diol or the above-described polyol. Further, the polyol carbonate oil may be a ring-opening polymer of a cyclic alkylene carbonate.

The ether refrigerant oil may be a polyvinyl ether oil or a polyoxyalkylene oil.

The polyvinyl ether oil may be a polymer obtained by polymerizing a vinyl ether monomer such as an alkyl vinyl ether, or a copolymer obtained by copolymerizing a vinyl ether monomer and a hydrocarbon monomer having an olefinic double bond.

The vinyl ether monomer may be used alone or in combination of two or more.

The hydrocarbon monomer having an olefinic double bond may, for example, be ethylene, propylene, various forms of butene, various forms of pentene, various forms of hexene, various forms of heptene, various forms of octene, diisobutylene, triisobutylene, styrene, α-methylstyrene or alkyl-substituted styrene. The hydrocarbon monomer having an olefinic double bond may be used alone or in combination of two or more.

The polyvinyl ether copolymer may be either of a block copolymer and a random copolymer. The polyvinyl ether oil may be used alone or in combination of two or more.

The polyoxyalkylene oil may, for example, be a polyoxyalkylene monool, a polyoxyalkylene polyol, an alkyl ether of a polyoxyalkylene monool or a polyoxyalkylene polyol, or an ester of a polyoxyalkylene monool or a polyoxyalkylene polyol.

The polyoxyalkylene monool or the polyoxyalkylene polyol may be one obtained by e.g. a method of subjecting a $C_{2-4}$ alkylene oxide (such as ethylene oxide or propylene oxide) to ring-opening addition polymerization to an initiator such as water or a hydroxy group-containing compound in the presence of a catalyst such as an alkali hydroxide. Further, one molecule of the polyoxyalkylene chain may contain single oxyalkylene units or two or more types of oxyalkylene units. It is preferred that at least oxypropylene units are contained in one molecule.

The initiator to be used for the reaction may, for example, be water, a monohydric alcohol such as methanol or butanol, or a polyhydric alcohol such as ethylene glycol, propylene glycol, pentaerythritol or glycerol.

The polyoxyalkylene oil is preferably an alkyl ether or ester of a polyoxyalkylene monool or polyoxyalkylene polyol. Further, the polyoxyalkylene polyol is preferably a polyoxyalkylene glycol. Particularly preferred is an alkyl ether of a polyoxyalkylene glycol having the terminal hydroxy group of the polyoxyalkylene glycol capped with an alkyl group such as a methyl group, which is called a polyglycol oil.

The fluorinated refrigerant oil may, for example, be a compound having hydrogen atoms of a synthetic oil (such as the after-mentioned mineral oil, poly-α-olefin, alkylbenzene or alkylnaphthalene) substituted by fluorine atoms, a perfluoropolyether oil or a fluorinated silicone oil.

The mineral refrigerant oil may, for example, be a naphthene mineral oil or a paraffin mineral oil obtained by purifying a refrigerant oil fraction obtained by atmospheric distillation or vacuum distillation of crude oil by a purification treatment (such as solvent deasphalting, solvent extraction, hydrocracking, solvent dewaxing, catalytic dewaxing, hydrotreating or clay treatment) optionally in combination.

The hydrocarbon refrigerant oil may, for example, be a poly-α-olefin, an alkylbenzene or an alkylnaphthalene.

The refrigerant oil may be used alone or in combination of two or more.

The refrigerant oil is preferably at least one member selected from a polyol ester oil, a polyvinyl ether oil and a polyglycol oil in view of compatibility with the working fluid.

The amount of the refrigerant oil is not limited within a range not to remarkably decrease the effects of the present invention, and is preferably from 10 to 100 parts by mass, more preferably from 20 to 50 parts by mass, per 100 parts by mass of the working fluid.

(Stabilizer)

The stabilizer is a component which improves the stability of the working fluid against heat and oxidation. As the stabilizer, a known stabilizer which has been used for a heat cycle system together with a working fluid comprising a halogenated hydrocarbon, for example, an oxidation resistance-improving agent, a heat resistance-improving agent or a metal deactivator, may be used without any particular restrictions.

The oxidation resistance-improving agent and the heat resistance-improving agent may, for example, be N,N'- diphenylphenylenediamine, p-octyldiphenylamine, p,p'-dioctyldiphenylamine, N-phenyl-1-naphthyamine, N-phenyl-2-naphthyamine, N-(p-dodecyl)phenyl-2-naphthylamine, di-1-naphthylamine, di-2-naphthylamine, N-alkylphenothiazine, 6-(t-butyl)phenol, 2,6-di-(t-butyl)phenol, 4-methyl-2,6-di-(t-butyl)phenol or 4,4'-methylenebis(2,6-di-t-butylphenol). Each of the oxidation resistance-improving agent and the heat resistance-improving agent may be used alone or in combination of two or more.

The metal deactivator may, for example, be imidazole, benzimidazole, 2-mercaptobenzothiazole, 2,5-dimercaptothiadiazole, salicylidene-propylenediamine, pyrazole, benzotriazole, tritriazole, 2-methylbenzamidazole, 3,5-dimethylpyrazole, methylenebis-benzotriazole, an organic acid or an ester thereof, a primary, secondary or tertiary aliphatic amine, an amine salt of an organic acid or inorganic acid, a heterocyclic nitrogen-containing compound, an amine salt of an alkyl phosphate, or a derivative thereof.

The amount of the stabilizer is not limited within a range not to remarkably decrease the effects of the present invention, and is preferably at most 5 parts by mass, more preferably at most 1 part by mass per 100 parts by mass of the working fluid.

(Leak Detecting Substance)

The leak detecting substance may, for example, be an ultraviolet fluorescent dye, an odor gas or an odor masking agent.

The ultraviolet fluorescent dye may be known ultraviolet fluorescent dyes which have been used for a heat cycle system together with a working fluid comprising a halogenated hydrocarbon, such as dyes as disclosed in e.g. U.S. Pat. No. 4,249,412, JP-A-10-502737, JP-A-2007-511645, JP-A-2008-500437 and JP-A-2008-531836.

The odor masking agent may be known perfumes which have been used for a heat cycle system together with a working fluid comprising a halogenated hydrocarbon, such as perfumes as disclosed in e.g. JP-A-2008-500437 and JP-A-2008-531836.

In a case where the leak detecting substance is used, a solubilizing agent which improves the solubility of the leak detecting substance in the working fluid may be used.

The solubilizing agent may be ones as disclosed in e.g. JP-A-2007-511645, JP-A-2008-500437 and JP-A-2008-531836.

The amount of the leak detecting substance is not particularly limited within a range not to remarkably decrease the effects of the present invention, and is preferably at most 2 parts by mass, more preferably at most 0.5 part by mass per 100 parts by mass of the working fluid.

<Heat Cycle System>

Now, the heat cycle system of the present invention employing the above working fluid for heat cycle will be described. The heat cycle system is a system employing HFO-1123 as a working fluid for heat cycle. When the working fluid for heat cycle is applied to a heat cycle system, usually it is applied as a composition for a heat cycle system containing the working fluid.

Further, the heat cycle system of the present invention may be one of which the constitution of the basic heat cycle is the same as a conventionally known heat cycle system, and may be a heat pump system utilizing heat obtained by a condenser or may be a refrigerating cycle system utilizing coldness obtained by an evaporator.

Such a heat cycle system may, for example, be specifically a refrigerating apparatus, an air-conditioning apparatus, a power generation system, a heat transfer apparatus or a secondary cooling machine. Among them, the heat cycle system of the present invention, which stably exhibits heat cycle performance in a working environment at higher temperature, is preferably employed as an air-conditioning apparatus to be disposed outdoors in many cases. Further, the heat cycle system of the present invention is preferably employed also for a refrigerating apparatus.

The air-conditioning apparatus may, for example, be specifically a room air-conditioner, a package air-conditioner (such as a store package air-conditioner, a building package air-conditioner or a plant package air-conditioner), a gas engine heat pump, a train air-conditioning system or an automobile air-conditioning system.

The refrigerating apparatus may, for example, be specifically a showcase (such as a built-in showcase or a separate showcase), an industrial fridge freezer, a vending machine or an ice making machine.

The power generation system is preferably a power generation system by Rankine cycle system.

The power generation system may, for example, be specifically a system wherein in an evaporator, a working fluid is heated by e.g. geothermal energy, solar heat or waste heat in a medium-to-high temperature range at a level of from 50 to 200° C., and the vaporized working fluid in a high temperature and high pressure state is adiabatically expanded by an expansion device, so that a power generator is driven by the work generated by the adiabatic expansion to carry out power generation.

Further, the heat cycle system of the present invention may be a heat transport apparatus. The heat transport apparatus is preferably a latent heat transport apparatus.

The latent heat transport apparatus may, for example, be a heat pipe conducting latent heat transport utilizing evaporation, boiling, condensation, etc. of a working fluid filled in an apparatus, and a two-phase closed thermosiphon. A heat pipe is applied to a relatively small-sized cooling apparatus such as a cooling apparatus of a heating portion of a semiconductor device and electronic equipment. A two-phase closed thermosiphon is widely used for a gas/gas heat exchanger, to accelerate snow melting and to prevent freezing of roads, since it does not require a wick and its structure is simple.

Now, as an example of the heat cycle system according the embodiment of the present invention, a refrigerating cycle system 10 shown in FIG. 1 will be described. Here, a refrigerating cycle system is a system utilizing coldness obtained by an evaporator.

Figure 1:
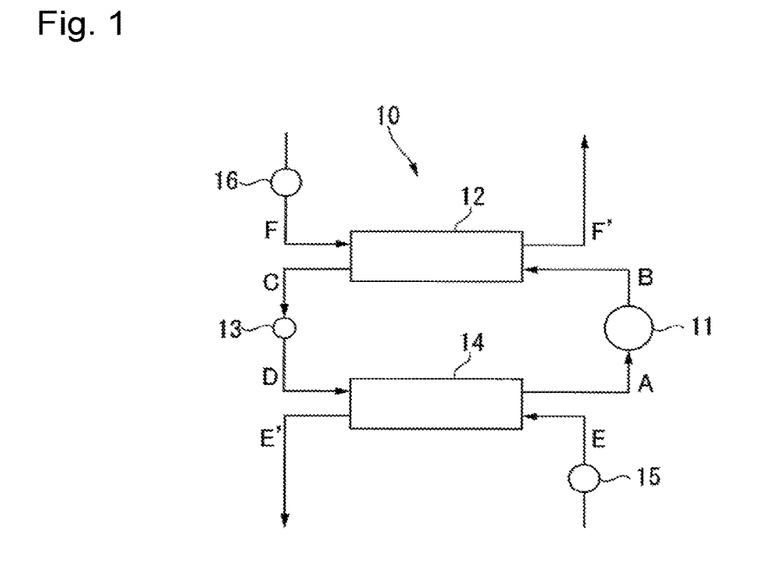
FIG. 1 is a schematic construction view illustrating a refrigerating cycle system as an example of a heat cycle system of the present invention.

A refrigerating cycle system 10 shown in FIG. 1 is a system generally comprising a compressor 11 to compress a working fluid vapor A to form a high temperature/high pressure working fluid vapor B, a condenser 12 to cool and liquefy the working fluid vapor B discharged from the compressor 11 to form a low temperature/high pressure working fluid C, an expansion valve 13 to let the working fluid C discharged from the condenser 12 expand to form a low temperature/low pressure working fluid D, an evaporator 14 to heat the working fluid D discharged from the expansion valve 13 to form a high temperature/low pressure working fluid vapor A, a pump 15 to supply a load fluid E to the evaporator 14, and a pump 16 to supply a fluid F to the condenser 12. That is, the refrigerating cycle system 10 is operated, in the same manner as a known heat cycle system, by circulating the working fluid for heat cycle from the compressor 11, via the condenser 12, the expansion valve 13 and the evaporator 14, to the compressor 11.

First, the flow of the refrigerating cycle will be described. In the refrigerating cycle system 10, a cycle of the following (i) to (iv) is repeated.

(i) A working fluid vapor A discharged from an evaporator 14 is compressed by a compressor 11 to form a high temperature/high pressure working fluid vapor B (hereinafter referred to as "AB process").

(ii) The working fluid vapor B discharged from the compressor 11 is cooled and liquefied by a fluid F in a condenser 12 to form a low temperature/high pressure working fluid C. At that time, the fluid F is heated to form a fluid F', which is discharged from the condenser 12 (hereinafter referred to as "BC process").

(iii) The working fluid C discharged from the condenser 12 is expanded in an expansion valve 13 to form a low temperature/low pressure working fluid D (hereinafter referred to as "CD process").

(iv) The working fluid D discharged from the expansion valve 13 is heated by a load fluid E in the evaporator 14 to form a high temperature/low pressure working fluid vapor A. At that time, the load fluid E is cooled and becomes a load fluid E', which is discharged from the evaporator 14 (hereinafter referred to as "DA process").

The refrigerating cycle system 10 is a cycle system comprising an adiabatic isentropic change, an isenthalpic change and an isobaric change. The state change of the working fluid, as represented on a pressure-enthalpy diagram (curve) as shown in FIG. 2, may be represented as a trapezoid having points A, B, C and D as vertexes.

Figure 2:
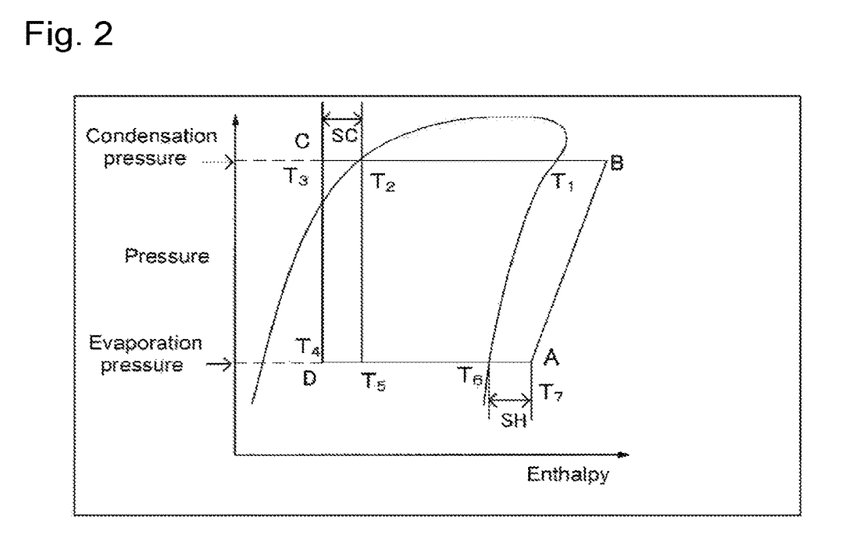
FIG. 2 is a cycle diagram illustrating the state change of a working fluid in the refrigerating cycle system in FIG. 1 on a pressure-enthalpy diagram.

The AB process is a process wherein adiabatic compression is carried out by the compressor 11 to change the high temperature/low pressure working fluid vapor A to a high temperature/high pressure working fluid vapor B, and is represented by the line AB in FIG. 2.

The BC process is a process wherein isobaric cooling is carried out in the condenser 12 to change the high temperature/high pressure working fluid vapor B to a low temperature/high pressure working fluid C and is represented by the BC line in FIG. 2. The pressure in this process is the condensation pressure. Of the two intersection points of the pressure-enthalpy diagram and the BC line, the intersection point $T_1$ on the high enthalpy side is the condensing temperature, and the intersection point $T_2$ on the low enthalpy side is the condensation boiling point temperature. Here, the temperature glide in the case of a non-azeotropic mixture fluid which is a mixed fluid of HFO-1123 with another working fluid, is represented by the difference between $T_1$ and $T_2$.

The CD process is a process wherein isenthalpic expansion is carried out by the expansion valve 13 to change the low temperature/high pressure working fluid C to a low temperature/low pressure working fluid D and is presented by the CD line in FIG. 2. $T_2$-$T_3$ corresponds to the supercoiling degree (hereinafter referred to as "SC" as the case requires) of the working fluid in the cycle of (i) to (iv), where $T_3$ is the temperature of the low temperature/high pressure working fluid C.

The DA process is a process wherein isobaric heating is carried out in the evaporator 14 to have the low temperature/low pressure working fluid D returned to a high temperature/low pressure working fluid vapor A, and is represented by the DA line in FIG. 2. The pressure in this process is the evaporation pressure. Of the two intersection points of the pressure-enthalpy diagram and the DA line, the intersection point $T_6$ on the high enthalpy side is the evaporation temperature. $T_7$-$T_6$ corresponds to the degree of superheat (hereinafter referred to as "SH" as the case requires) of the working fluid in the cycle of (i) to (iv), where $T_7$ is the temperature of the working fluid vapor A. $T_4$ indicates the temperature of the working fluid D.

And, in the heat cycle system of the present invention, in its circulation path, the conductor wire is covered with a heat resistant material having a heat resistance of at least 300° C. By covering the conductor wire with a very highly heat resistant material, the self-decomposition reaction of HFO-1123 can be suppressed even in a case where the interior of the apparatus of the heat cycle system is in an abnormal high temperature or high pressure state by e.g. abnormal operation. That is, even in a case where HFO-1123 is present at a high concentration and is under high temperature or high pressure conditions, the conductor wire at which the self-decomposition reaction may originate, can be stably covered with a heat resistant material. Accordingly, such will not occur that the covering material is eliminated by melting, decomposition or the like under high temperature or high pressure conditions, whereby the conductor is exposed, and such exposed portions are brought into contact with each other to cause electrical short circuit, from which the self-decomposition reaction originate. Thus, the above reaction can be effectively suppressed. In this specification, "having a heat resistance of at least 300° C." means such a heat resistance that at least part of the conductor wire covering material will not disappear due to melting, decomposition or the like and the conductor will not be exposed until a protection circuit or the like works, under conditions of less than 300° C. (total temperature region). Further, the time over which at least part of the covering material will not disappear and the conductor will not be exposed, is preferably at least 0.1 second, more preferably at least 0.3 second, further preferably a least 0.5 second. The protection circuit or the like may, for example, be a ground fault interrupter. According to JIS-8201-2-2, a ground fault interrupter provided for the purpose of preventing electrical shock accidents is required to operate within 0.1 second. Further, at 300° C. or higher, HFO-1123 will not undergo self-decomposition reaction since HFO-1123 itself undergoes dimerization. Accordingly, when the covering material for the conductor wire has a heat resistance of at least 300° C., the self-decomposition reaction of HFO-1123 can be securely prevented in the heat cycle system employing HFO-1123 according to the present embodiment as the working fluid for heat cycle.

Now, a compressor having a conductor wire cover with a heat resistant material in its circulation path will be described with reference to FIG. 3. Here, an example will be described in which a conductor wire covered with a heat resistant material is provided to a scroll compressor. A scroll compressor 110 shown in FIG. 3 comprises a closed container 111, and in the closed container 111, a driving means comprising a stator 112 and a rotor 113, a scroll compression mechanism 114 to compress the working fluid for heat cycle by revolutions of the driving means, a suction pipe 115 connected to the compressor, to introduce the working fluid for heat cycle into the scroll compression mechanism 114, a delivery pipe 116 connected to a condenser, to send the working fluid for heat cycle compressed in the closed container 111 to the condenser side, a power supply terminal 117 connected to the closed container 111, to supply electric power to the driving means as connected to a power source, and a covered conductor wire 118 covered with a heat resistant material, connecting the power supply terminal 117 and the driving means.

The scroll compressor 110 basically has the same constitution as a known compressor, and is characterized by the covered conductor wire 118. Accordingly, the covered conductor wire 118 will be described. Here, the compressor is described with reference to a scroll compressor as an example, however, a known compressor may be applied without any particular restrictions. For example, a piston crank compressor, a piston swash plate compressor, a rotary piston compressor, a rotary-vane compressor, a single rotor compressor, a twin rotor compressor or a centrifugal compressor may, for example, be mentioned.

Figure 3:
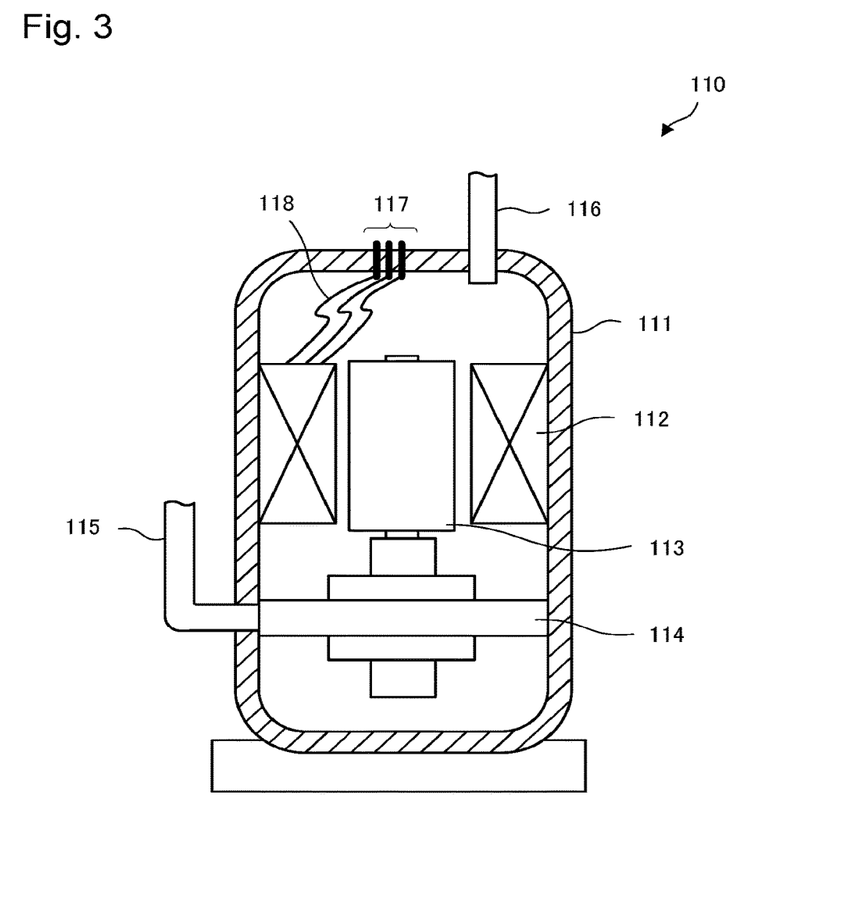
FIG. 3 is a view illustrating the schematic constitution of a compressor having a covered conductor wire covered with a heat resistant material.

The driving means of the compressor, for example, the stator 112 and the rotor 113 in FIG. 3, are usually connected to a power source via the power supply terminal 117, to get the drive energy. The conductor wire of e.g. copper to connect the driving means and the power supply terminal 117 is usually covered with an insulating material. The material covering the conductor wire is usually covered with e.g. polyethylene terephthalate. However, at the time of the above-mentioned abnormal operation, if the temperature exceeds the heat resistant temperature of the material covering the conductor wire, the heat resistant material is deteriorated, and the conductor wire is exposed and is brought into contact with HFO-1123, whereby the self-decomposition reaction of HFO-1123 may proceed.

Accordingly, by forming the heat resistant material covering the conductor wire used in the heat cycle system, by a material having higher heat resistance than ever before, the heat resistant material can stably cover the conductor wire even in an abnormal high temperature state. Particularly in the heat cycle system employing a working fluid containing HFO-1123, contact of the conductor wire with HFO-1123 can be prevented, and the self-decomposition reaction of HFO-1123 can be suppressed.

The heat resistant material used may, for example, be an electric wire material exemplified in thermal classes H, N, R and 250 in JIS C4003. For example, as a primary material, one having high heat resistance such as mica, asbestos, alumina, silica glass, quartz, magnesium oxide, a polytetrafluoroethylene resin, a silicone rubber, a silicone resin, a polyimide resin, a polyetherimide resin or a polyamide imide resin may be mentioned. A highly heat resistant resin or rubber such as a tetrafluoroethylene resin, a silicone rubber, a silicone resin or a polyimide resin can be used for covering the conductor wire, and an inorganic powder such as mica, alumina or silica glass or inorganic fibers such as asbestos or glass fibers may be used as blended with a heat resistant resin or rubber. Further, inorganic fibers such as asbestos or glass fibers may be used to cover the conductor wire in the form of knit fabric.

Further, a resin which will not be melted or decomposed at 300° C. or below among a polybenzimidazole resin, a polyether ether ketone resin, a polyphenylene sulfide resin, a polyamide resin, a polybutylene terephthalate resin, an acetylcellulose resin, etc. may be used as the heat resistant resin. Further, a cured product (which will not be decomposed at 300° C. or below) of a thermosetting resin such as an allyl resin or a diallyl phthalate resin may be used as the heat resistant resin.

The heat resistant material is preferably mica, asbestos, alumina, silica glass, a polyimide resin, a polyetherimide resin or a polyamide imide resin.

Such a heat resistant material may be used alone, however, in order to impart favorable heat resistance, preferably used in combination of two or more. For example, preferred is a heat resistant material comprising an inorganic material (which may be fibrous) such as mica, asbestos, alumina or silica glass and a highly heat resistant resin such as a polyimide resin, a polyetherimide resin or a polyamide imide resin, in combination. Further, the outer periphery of the conductor wire covered with such a heat resistant material may further be protected with a flexible heat resistant resin such as a silicone resin.

Further, as an impregnation coating material or an insulation treatment material used to produce the heat resistant electric wire, a curable resin (of which the cured product will not be decomposed at 300° C. or below) such as a curable silicone resin, an allyl resin or a diallyl phthalate resin may be mentioned. Such an impregnation coating material or insulation treatment material is to achieve an auxiliary function, for example, improvement of the insulating property, when used in combination with the above heat resistant material.

(Moisture Concentration)

At the time of operation of the heat cycle system, in order to avoid drawbacks due to inclusion of moisture or inclusion of non-condensing gas such as oxygen, it is preferred to provide a means to suppress such inclusion.

If moisture is included in the heat cycle system, a problem may occur particularly when the heat cycle system is used at low temperature. For example, problems such as freezing in a capillary tube, hydrolysis of the working fluid or the refrigerant oil, deterioration of materials by an acid component formed in the cycle, formation of contaminants, etc. may arise. Particularly, if the refrigerant oil is a polyglycol oil or a polyol ester oil, it has extremely high moisture absorbing properties and is likely to undergo hydrolysis, and inclusion of moisture decreases properties of the refrigerant oil and may be a great cause to impair the long term reliability of a compressor. Accordingly, in order to suppress hydrolysis of the refrigerant oil, it is necessary to control the moisture concentration in the heat cycle system.

As a method of controlling the moisture concentration in the heat cycle system, a method of using a moisture-removing means such as a desiccating agent (such as silica gel, activated aluminum, zeolite or lithium chloride) may be mentioned.

The desiccating agent is preferably brought into contact with the working fluid in a liquid state, in view of the dehydration efficiency. For example, the desiccating agent is located at the outlet of the condenser 12 or at the inlet of the evaporator 14 to be brought into contact with the working fluid.

The desiccating agent is preferably a zeolite desiccating agent in view of chemical reactivity of the desiccating agent and the working fluid, and the moisture absorption capacity of the desiccating agent.

The zeolite desiccating agent is, in a case where a refrigerant oil having a large moisture absorption as compared with a conventional mineral refrigerant oil is used, preferably a zeolite desiccating agent containing a compound represented by the following formula (3) as the main component in view of excellent moisture absorption capacity.

$$M_{2/n}O \cdot Al_2O_3 \cdot xSiO_2 \cdot yH_2O \quad (3)$$

wherein M is a group 1 element such as Na or K or a group 2 element such as Ca, n is the valence of M, and x and y are values determined by the crystal structure. The pore size can be adjusted by changing M.

To select the desiccating agent, the pore size and the fracture strength are important.

In a case where a desiccating agent having a pore size larger than the molecular size of the working fluid is used, the working fluid is adsorbed in the desiccating agent and as a result, chemical reaction between the working fluid and the desiccating agent will occur, thus leading to undesired phenomena such as formation of non-condensing gas, a decrease in the strength of the desiccating agent, and a decrease in the adsorption capacity.

Accordingly, it is preferred to use as the desiccating agent a zeolite desiccating agent having a small pore size. Particularly preferred is sodium/potassium type A synthetic zeolite having a pore size of at most 3.5 Å. By using a sodium/potassium type A synthetic zeolite having a pore size smaller than the molecular size of the working fluid, it is possible to selectively adsorb and remove only moisture in the heat cycle system without adsorbing the working fluid. In other words, the working fluid is less likely to be adsorbed in the desiccating agent, whereby heat decomposition is less likely to occur and as a result, deterioration of materials constituting the heat cycle system and formation of contaminants can be suppressed.

The size of the zeolite desiccating agent is preferably from about 0.5 to about 5 mm, since if it is too small, a valve or a thin portion in pipelines of the heat cycle system may be clogged, and if it is too large, the drying capacity will be decreased. Its shape is preferably granular or cylindrical.

The zeolite desiccating agent may be formed into an optional shape by solidifying powdery zeolite by a binding agent (such as bentonite). So long as the desiccating agent is composed mainly of the zeolite desiccating agent, other desiccating agent (such as silica gel or activated alumina) may be used in combination.

The proportion of the zeolite desiccating agent based on the working fluid is not particularly limited.

The moisture concentration in the heat cycle system is preferably less than 10,000 ppm, more preferably less than 1,000 ppm, particularly preferably less than 100 ppm, by the mass ratio based on the working fluid for heat cycle.

(Non-Condensing Gas Concentration)

If non-condensing gas is included in the heat cycle system, it has adverse effects such as heat transfer failure in the condenser or the evaporator and an increase in the working pressure, and it is necessary to suppress its inclusion as far as possible. Particularly, oxygen which is one of non-condensing gases reacts with the working fluid or the refrigerant oil and promotes their decomposition.

The non-condensing gas concentration is preferably less than 10,000 ppm, more preferably less than 1,000 ppm, particularly preferably less than 100 ppm by the mass ratio based on the working fluid for heat cycle.

(Chlorine Concentration)

If chlorine is present in the heat cycle system, it has adverse effects such as formation of a deposit by a reaction with a metal, friction of a bearing, and decomposition of the working fluid for heat cycle or the refrigerant oil.

The chlorine concentration in the heat cycle system is preferably at most 100 ppm, particularly preferably at most 50 ppm by the mass ratio based on the working fluid for heat cycle.

(Metal Concentration)

If a metal such as palladium, nickel or iron is present in the heat cycle system, it has adverse effects such as decomposition or oligomerization of HFO-1123.

The metal concentration in the heat cycle system is preferably at most 5 ppm, particularly preferably at most 1 ppm by the mass ratio based on the working fluid for heat cycle.

(Acid Concentration)

If an acid is present in the heat cycle system, it has adverse effects such as oxidative destruction or acceleration of self-decomposition reaction of HFO-1123.

The acid concentration in the heat cycle system is preferably at most 1 ppm, particularly preferably at most 0.2 ppm by the mass ratio based on the working fluid for heat cycle.

Further, it is preferred to provide a means to remove an acid content by a deoxidizing agent such as NaF in the heat cycle system, for the purpose of removing the acid content from the composition for heat cycle, thereby to remove the acid content from the heat cycle composition.

(Residue Concentration)

If a residue such as a metal powder, an oil other than the refrigerant oil or a high boiling component is present in the heat cycle system, it has adverse effects such as clogging of a vaporizer and an increase in the resistance of a rotating part.

The residue concentration in the heat cycle system is preferably at most 1,000 ppm, particularly preferably at most 100 ppm by the mass ratio based on the working fluid for heat cycle.

The residue may be removed by subjecting the working fluid for heat cycle to filtration through e.g. a filter. Further, the components (HFO-1123, HFO-1234yf and the like) of the working fluid for heat cycle may be separately subjected to filtration through a filter to remove the residue, before they are formed into a working fluid for heat cycle, and then the components are mixed to form a working fluid for heat cycle.

According to the above-mentioned heat cycle system, which employs a working fluid for heat cycle containing trifluoroethylene, practical cycle performance will be obtained while the influence over global warming is suppressed, and the self-decomposition reaction of HFO-1123 at the time of abnormal operation can be suppressed.

INDUSTRIAL APPLICABILITY

The heat cycle system of the present invention is useful as a refrigerating apparatus (such as a built-in showcase, a separate showcase, an industrial fridge freezer, a vending machine or an ice making machine), an air-conditioning apparatus (such as a room air-conditioner, a store package air-conditioner, a building package air-conditioner, a plant package air-conditioner, a gas engine heat pump, a train air-conditioning system or an automobile air-conditioning system), a power generation system (such as exhaust heat recovery power generation), a heat transport apparatus (such as a heat pipe) or a secondary cooling machine.

This application is a continuation of PCT Application No. PCT/JP2015/072705 filed on Aug. 10, 2015, which is based upon and claims the benefit of priority from Japanese Patent Application No. 2014-164315 filed on Aug. 12, 2014. The contents of those applications are incorporated herein by reference in their entireties.

REFERENCE SYMBOLS

10: refrigerating cycle system, 11: compressor, 12: condenser, 13: expansion valve, 14: evaporator, 15, 16: pump, 110: scroll compressor, 111: closed container, 112: stator, 113: rotor, 114: scroll compression mechanism, 115: suction pipe, 116: delivery pipe, 117: power supply terminal, 118: covered conductor wire

What is claimed is:

1. A heat cycle system, comprising:
   a working fluid for heat cycle comprising trifluoroethylene;

a compressor which comprises:
- an outer shell;
- a driver provided on an inside of the outer shell;
- a power supply terminal provided on the outer shell and capable of supplying an electric power from an external power source; and
- a conductor wire provided on the inside of the outer shell and connecting the driver and the power supply terminal;

a condenser;
an expansion valve;
an evaporator; and
circulation path in which the working fluid is circulated from the compressor via the condenser, the expansion valve and the evaporator to the compressor,
wherein the conductor wire is covered with a heat resistant material having a heat resistance of at least 300° C., and the heat resistance material is a blend of at least one inorganic material selected from the group consisting of an inorganic powder and an inorganic fiber, and at least one heat resistant resin selected from the group consisting of a polytetrafluoroethylene resin, a silicone rubber, a silicone resin, a polyimide resin, a polyetherimide resin, a polyamide imide resin, a polybenzimidazole resin, a polyether ether ketone resin, a polyphenylene sulfide resin, a polyamide resin, a polybutylene terephthalate resin, an acetylcellulose resin, an allyl resin, and a diallyl phthalate resin.

2. The heat cycle system according to claim 1, wherein the at least one inorganic material is selected from the group consisting of mica, asbestos, alumina, silica glass, and a combination thereof, and the at least one heat resistant resin is selected from the group consisting of a polyimide resin, a polyetherimide resin, a polyamide imide resin, and a combination thereof.

3. The heat cycle system according to claim 1, wherein the at least one inorganic material is selected from the group consisting of mica, asbestos, alumina, and silica glass, quartz, magnesium oxide, and a combination thereof.

4. The heat cycle system according to claim 1, wherein the outer periphery of the conductor wire covered with the heat resistant material is further protected with a silicone resin.

5. The heat cycle system according to claim 1, wherein a content of the trifluoroethylene in the working fluid is larger than 50 mass %.

6. The heat cycle system according to claim 5, wherein a content of the trifluoroethylene in the working fluid is larger than 60 mass %.

7. The heat cycle system according to claim 1, wherein the working fluid further comprises at least one selected from the group consisting of difluoromethane, 1,1,1,2-tetrafluoroethane and pentafluoroethane.

8. The heat cycle system according to claim 1, wherein the working fluid further comprises at least one selected from the group consisting of 2,3,3,3-tetrafluoro-1-propene, trans-1,2-difluoroethylene and cis-1,2-difluoroethylene.

9. The heat cycle system according to claim 1, wherein the working fluid is a mixed fluid of trifluoroethylene and difluoromethane.

10. The heat cycle system according to claim 1, wherein the working fluid is a mixed fluid of trifluoroethylene, difluoromethane and 2,3,3,3-tetrafluoro-1-propene.

11. The heat cycle system according to claim 1, which is a refrigerating apparatus, an air-conditioning apparatus, a power generation system, a heat transport apparatus or a secondary cooling machine.

12. The heat cycle system according to claim 1, which is a room air-conditioner, a store package air-conditioner, a building package air-conditioner, a plant package air-conditioner, a gas engine heat pump, a train air-conditioning system, an automobile air-conditioning system, a built-in showcase, a separate showcase, an industrial fridge freezer, an ice making machine or a vending machine.

13. The heat cycle system according to claim 1, wherein the compressor is configured to compress the working fluid in the outer shell.

* * * * *